(12) United States Patent  (10) Patent No.: US 8,380,701 B1
Konik et al.  (45) Date of Patent: Feb. 19, 2013

(54) USING A PARTIALLY BUILT INDEX IN A COMPUTER DATABASE SYSTEM

(75) Inventors: Rafal P. Konik, Oronoco, MN (US); Roger A. Mittelstadt, Byron, MN (US); Brian R. Muras, Rochester, MN (US); Mark W. Theuer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/225,058

(22) Filed: Sep. 2, 2011

(51) Int. Cl.
*G06F 7/00* (2006.01)
*G06F 17/30* (2006.01)

(52) U.S. Cl. ......... 707/713; 707/715; 707/736; 707/741
(58) Field of Classification Search .................. 707/715, 707/769, 713, 736, 741
See application file for complete search history.

(56) References Cited

U.S. PATENT DOCUMENTS

| | | | | |
|---|---|---|---|---|
| 3,585,601 A * | 6/1971 | Lahrson et al. | ............... | 718/101 |
| 5,517,641 A * | 5/1996 | Barry et al. | ............... | 1/1 |
| 5,887,274 A * | 3/1999 | Barry et al. | ............... | 1/1 |
| 6,003,022 A * | 12/1999 | Eberhard et al. | ............... | 1/1 |
| 6,289,334 B1 * | 9/2001 | Reiner et al. | ............... | 1/1 |
| 6,999,958 B2 * | 2/2006 | Carlson et al. | ............... | 1/1 |
| 7,634,487 B2 * | 12/2009 | Bae et al. | ............... | 1/1 |
| 2004/0236727 A1 * | 11/2004 | Day et al. | ............... | 707/3 |
| 2005/0097072 A1 | 5/2005 | Brown et al. | | |
| 2008/0027907 A1 | 1/2008 | Brown et al. | | |
| 2008/0065595 A1 * | 3/2008 | Muras et al. | ............... | 707/2 |
| 2009/0182724 A1 * | 7/2009 | Day et al. | ............... | 707/5 |
| 2010/0106713 A1 | 4/2010 | Esuli et al. | | |
| 2010/0185639 A1 * | 7/2010 | Day et al. | ............... | 707/758 |

* cited by examiner

*Primary Examiner* — Merilyn Nguyen
(74) *Attorney, Agent, or Firm* — Martin & Associates, LLC; Bret J. Petersen

(57) ABSTRACT

A partially built index is used in a computer database system. When a database index is being built, or rebuilt, the database manager keeps track of the records processed using a relative row number (RRN) to track what part of the partially built index is complete. Queries are optimized by a query optimizer associated with the database manager that uses the portion of the index that is complete with reference to the RRN. The remainder of the database table beyond the RRN can be estimated or implemented using the completed data or can be determined by searching the relevant portion of the database table.

14 Claims, 6 Drawing Sheets

USING A PARTIALLY BUILT INDEX IN A COMPUTER DATABASE SYSTEM

BACKGROUND OF THE INVENTION

1. Technical Field

This invention generally relates to querying a database in a computer database system, and more specifically relates to a using a partially built index to access a database.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query. The database manager may use an index to find the requested data by the query. A large database requires many large indexes that must be maintained to efficiently access the database.

When these large indexes are being created or rebuilt, the database manager determines the index is not complete. When an invalid state occurs, the database manager marks an incomplete or outdated index as invalid and then the database manager requests a server job to rebuild the index. This is problematic because when the index is marked "invalid", the index can not be used by any query and the index may take a long time to rebuild, hours, or perhaps days.

DISCLOSURE OF INVENTION

According to the preferred embodiments, an apparatus and method is described for using a partially built index in a computer database system. When a database index is being built, or rebuilt, the database manager keeps track of the records processed using a relative row number (RRN) to track what part of the partially built index is complete. Queries are optimized by a query optimizer associated with the database manager that uses the portion of the index that is complete with reference to the RRN. The remainder of the database table beyond the RRN can be estimated or implemented using the completed data or can be determined by searching the relevant portion of the database table. Using a partially built index as described herein increases the efficiency of the database system by allowing access to the database without having to wait for the complete rebuild of the database indexes.

The disclosed embodiments are directed to a generic computer architecture and could be implemented on any computer database system.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

The present invention relates to queries to a computer database table. For those not familiar with databases, queries, or query optimizers, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces an access plan to execute the query in the database. The access plan may be stored in an access plan cache for use with subsequent queries that use the same plan. In the prior art, a tool known as a query optimizer evaluates expressions in a query and optimizes the query and the access plan to access the database.

As introduced above, databases are often configured with query optimizers associated with or integral to the database manager to analyze incoming queries and produce an optimal access plan to execute the query.

2.0 Detailed Description

An apparatus and method is described herein for using a partially built index in a computer database system. When a database index is being built, or rebuilt, the database manager keeps track of the records processed using a relative row number (RRN) so that it will know what part of the partially built index is complete. Queries are optimized by a query optimizer associated with the database manager that uses the portion of the index that is complete with reference to the RRN. The remainder of the database table beyond the RRN can be estimated using the completed data or can be determined by searching the relevant portion of the database table.

Figure 1:
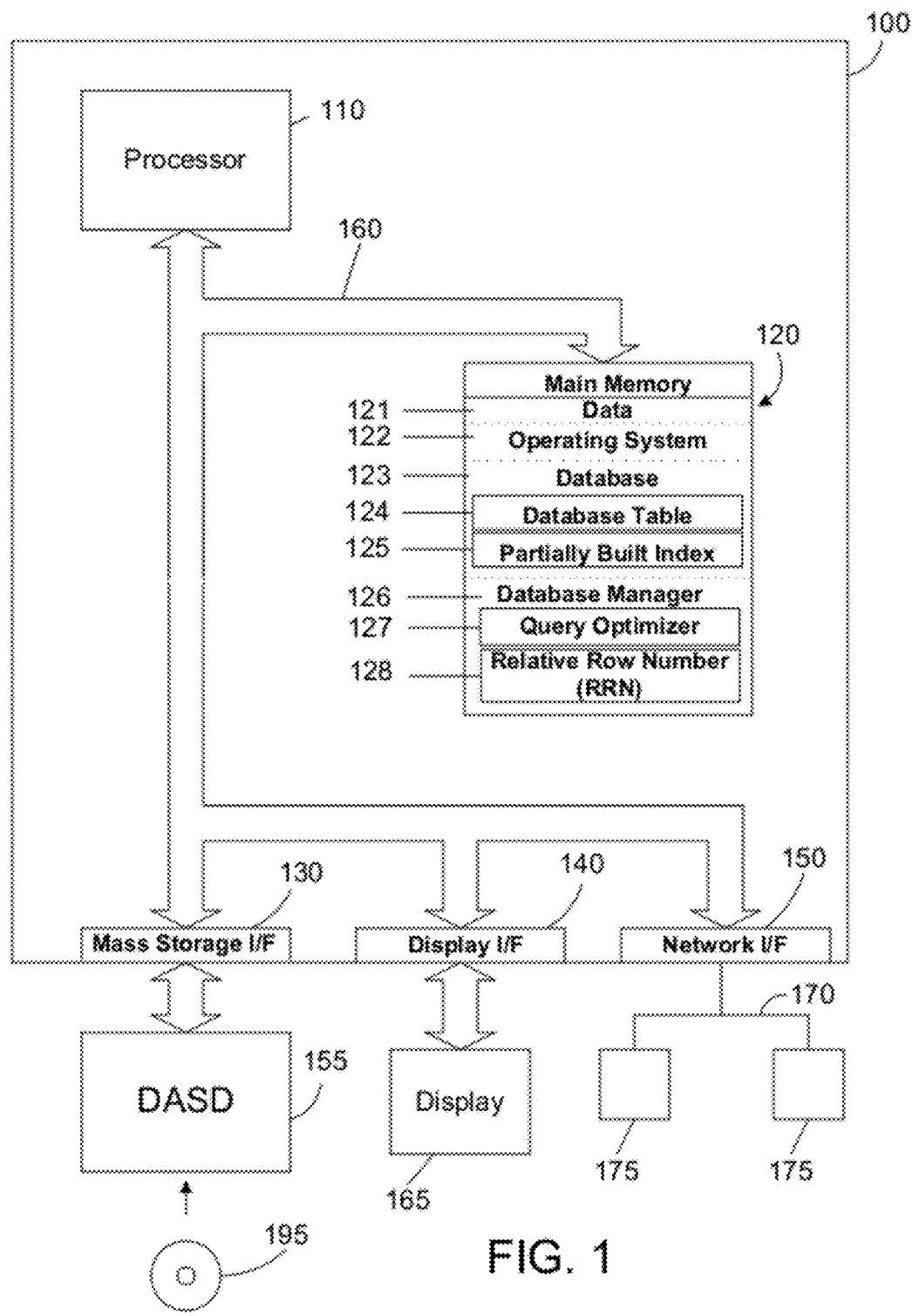
FIG. 1 is a block diagram of a computer database system for using a partially built index.

Referring to FIG. 1, a computer system 100 is one suitable implementation of an apparatus in accordance with the preferred embodiments of the invention. Computer system 100 is an IBM Power System computer system. However, those skilled in the art will appreciate that the mechanisms and apparatus of the present invention apply equally to any computer system, regardless of whether the computer system is a complicated multi-user computing apparatus, a single user workstation, or an embedded control system. As shown in FIG. 1, computer system 100 comprises one or more processors 110, a main memory 120, a mass storage interface 130, a display interface 140, and a network interface 150. These system components are interconnected through the use of a system bus 160. Mass storage interface 130 is used to connect mass storage devices, such as a direct access storage device 155, to computer system 100. One specific type of direct access storage device 155 is a readable and writable CD-RW drive, which may store data to and read data from a CD-RW 195.

Main memory 120 in accordance with the preferred embodiments contains data 121, an operating system 122, a database 123, and a database manager 126. Data 121 represents any data that serves as input to or output from any program in computer system 100. Operating system 122 is a multitasking operating system known in the industry as IBM i OS; however, those skilled in the art will appreciate that the spirit and scope of the present invention is not limited to any one operating system. Database 123 is any suitable database that includes tables, whether currently known or developed in the future. Database 123 preferably includes a database table 124 and a partially built index 125 as described herein. The database manager 126 for managing the database 123 includes a query optimizer 127 that is used to execute queries to the database 123. Note that query optimizer 127 is shown separate from database 123, but could also be implemented in database 123 within the scope of the disclosure and claims herein. The database further includes a relative row number (RRN) 128 that the database manager 126 maintains for each partially built index 125 to keep track of the records processed while the index is being built.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, database 123, database table 124, partially built index 125, database manager 126, query optimizer 127, and the RRN 128 are shown to reside in main memory 120, those skilled in the art will recognize that these items are not necessarily all completely contained in main memory 120 at the same time. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiments each include separate, fully programmed microprocessors that are used to off-load compute-intensive processing from processor 110. However, those skilled in the art will appreciate that the present invention applies equally to computer systems that simply use I/O adapters to perform similar functions.

Display interface 140 is used to directly connect one or more displays 165 to computer system 100. These displays 165, which may be non-intelligent (i.e., dumb) terminals or fully programmable workstations, are used to allow system administrators and users to communicate with computer system 100. Note, however, that while display interface 140 is provided to support communication with one or more displays 165, computer system 100 does not necessarily require a display 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of computer-readable media used to actually carry out the distribution. Examples of suitable computer-readable media include: recordable media such as floppy disks and CD-RW (e.g., 195 of FIG. 1), and transmission media such as digital and analog communications links.

Figure 2:
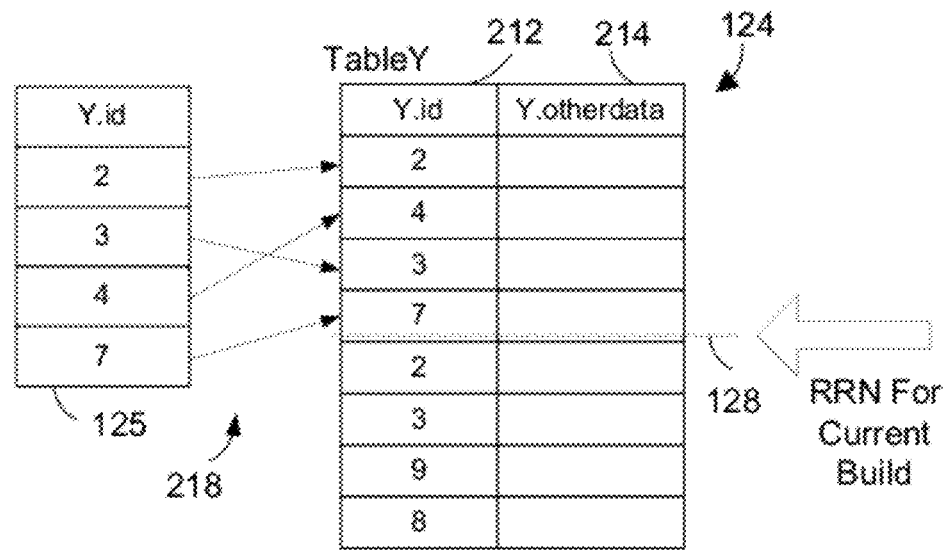
FIG. 2 is a block diagram that represents a database table and a partially built index for the table to illustrate an example for using a partially built index.

FIG. 2 illustrates an example of using a partially built index in a computer database system. In this example, TableY 126 represents the database table 126 residing in the database 124 shown in FIG. 1. TableY 126 has two columns, Y.id 212 and Y.otherdata 214. Y.id 212 is an identifier for the associated Y.otherdata 214 for each record in the table 210. In this example, a partially built index Y.id Index 125 is being built over the column Y.id 212. The partially built index 125 is shown about one-half built. A relative row number (RRN) 128 shows the current build position for the partially built index. The current build position means the point in the index where the database manager is currently updating or has finished updating the index. The Y.id index 125 as shown in FIG. 2 contains pointers to the record with the corresponding Y.id shown in the index. These pointers are illustrated as the arrows 218. It is assumed that the database manager is in the process of building the index 125 and the RRN corresponds to the position of the build or re-build for a snapshot in time. The database manager may continue the process of rebuilding the index or it may halt or pause the build. It is assumed that the data in the partially built index is maintained (i.e. reflects new updates, inserts and deletes) for records less than the RRN.

Figure 3:
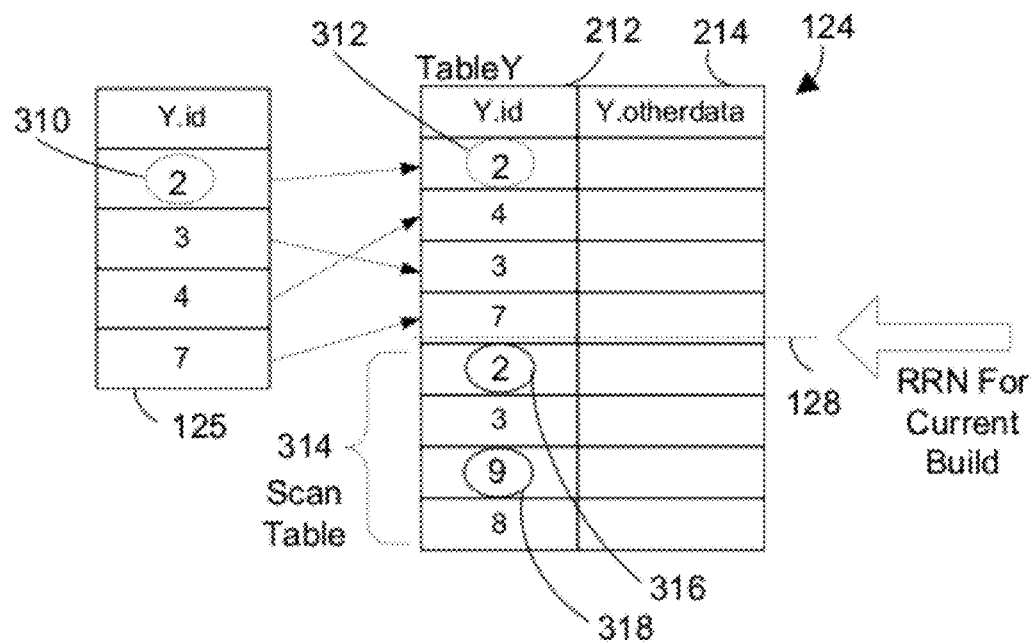
FIG. 3 is a block diagram that illustrates further details of the example shown in FIG. 2.

FIG. 3 further illustrates the example of using a partially built index in a computer database system shown in FIG. 2. In FIG. 2, it is assumed that the state of the index rebuild for the partially built index 125 is as shown in FIG. 2 when the database manager (FIG. 1) receives the following query:

Select * from Y where Y.id in (2,9)

The query optimizer determines that this query can be resolved using the partially built index 125. The query optimizer uses the partial built index 125 to find the value "2" 310 that corresponds to the record 312 in TableY 124. The value "9" is not available in the partially built index 125. The query optimizer then determines to scan the remainder of the table to satisfy the remainder of the query. TableY 124 is then scanned for records greater 314 than the RRN 128. The scan of the table results in additional records for Y.id values "2" 316 and "9" 318. Execution of the query over the partially built query is thus done efficiently and without waiting to completely rebuild the index.

As stated above, the RRN may be dynamically changing as the index is being rebuilt. The database manager uses the current value of the dynamically changing RRN to execute the query. This makes it possible to use the same optimized access plan for the query while the state of the partially built index is changing. Further, by using the current value for the RRN when the query is executed the query can be satisfied more efficiently. If the RRN is equal to the last row in the table then the query is satisfied using the now completed index and it would not be necessary to scan the table.

FIG. 3 can be used to further illustrate another example of using a partially built index in a computer database system. In this case the database manager and the query optimizer use extrapolation to estimate the number of rows the query will return or to retrieve an approximate result to satisfy the query. This could be desirable where the partially built index is rather large and/or where an approximation of the results is sufficiently accurate. In this case, instead of scanning the portion of the table below the RRN, that portion of the table is estimated by extrapolation. For example, the results from executing the query against the partial index is multiplied by a ratio representing the inverse of the amount the partially built index is complete to estimate the query results for the entire database table. This could be the RRN divided by the total number of rows in the table. Applying this method of extrapolation to FIG. 3, we see that executing the query against the table returned one record with the value of "2". The ratio representing the amount the partially built index is complete is one-half, so the inverse of the ratio is 2. Thus the extrapolated results would be two records with the value of "2". It can be seen that this method will miss the record with the value of "9" 318. For this example it is assumed that the return of the 2 estimated rows versus the 3 is accurate enough for the application. Thus it can be seen that there are tradeoffs to using the extrapolation method versus the scan table method described above. The extrapolation method is quicker and not as accurate but extrapolation of the partial index is useful where the estimation is sufficiently accurate. It is noted of course that the extrapolation method can not be used for all types of query but is useful for quires that count records, etc.

A third example of using a partially built index in a computer database system can be described with a general reference to the above figures. In this example, the query optimizer 127 (FIG. 1) determines that a temporary index is needed. This is usually determined where there is a join, grouping or ordering of a query and no suitable index is found. In this instance, the query optimizer can first look to see if there is a partially built index that matches the needed temporary index. If there is a match, then the partially built index 125 can be used to satisfy the query. The partially built index is built out completely and then used instead of using a temporary index. Alternatively, the partially built index can be used for the temporary index as described above.

During optimization the query optimizer may create multiple plans to satisfy the query with some plans using a partially built index. The query optimizer will choose the plan with the partially built index if it determines it can be done faster or more efficiently. Since the database table may be continually updating the partially built index after the access plan has been built, the database manager preferably uses the current RRN value of the dynamically changing RRN to insure the best possible performance at the time of execution of the query.

When the query optimizer is building an access plan to optimize a query for a partially built index, the optimizer first determines the costs of the query to execute over the portion of the table for which the index is partially built. It can choose to do an estimation of this cost over the partially built portion of the index. This estimate for costs over the partially built portion of the index can be done in a traditional manner. The optimizer then extrapolates the estimated costs to satisfy the query over the entire table. In this case, the portion of the table below the RRN is estimated by extrapolation in a similar manner as described for satisfying the query using extrapolation. The query optimizer calculates an inverse estimate (the total number of rows in the table divided by the RRN). The query optimizer then calculates an extrapolated estimate for the total query costs equal to the partial estimate times the inverse estimate. When an extrapolation is made for an estimated query access plan, a confidence value can be included with the result. For example, a confidence value representing the RRN/total rows of the table can be supplied to the query optimizer to use in determining which access plan to use, where a confidence value closer to "1" has a higher confidence. This method of estimating the costs to build an access plan is further described with reference to FIG. 4 below.

Figure 4:
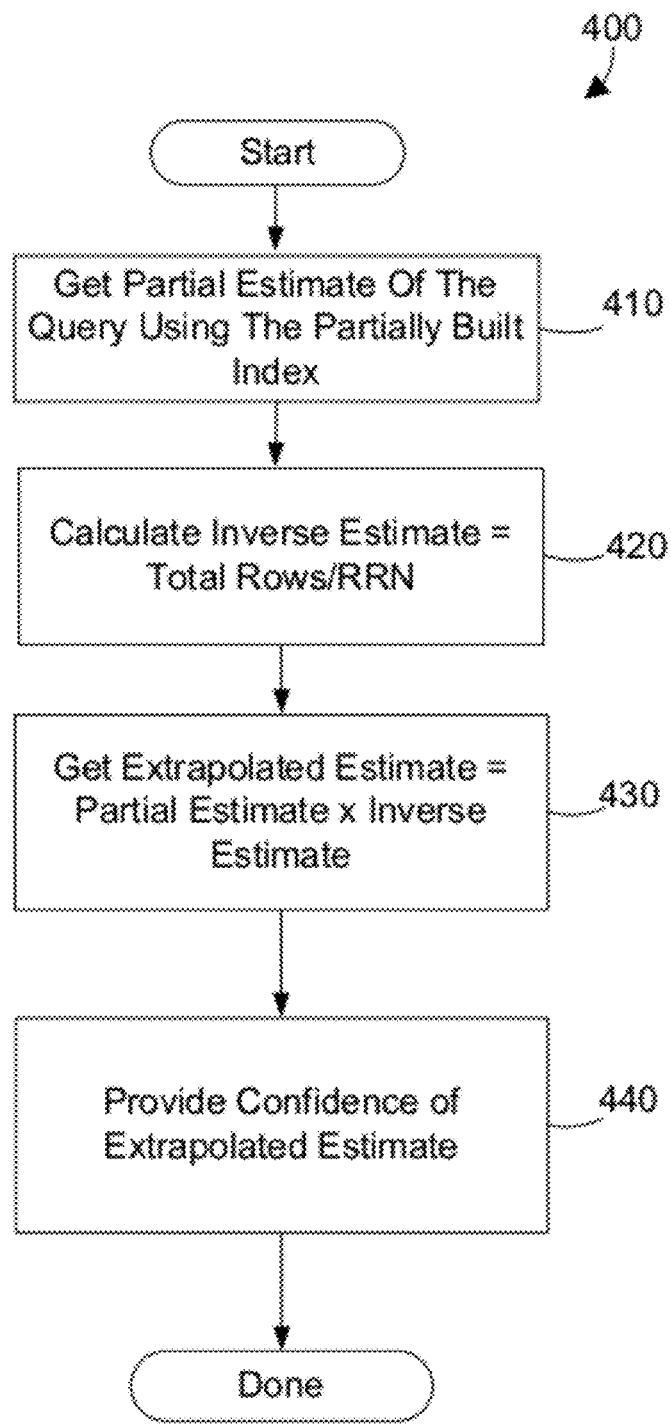
FIG. 4 is a method flow diagram for using a partially built index.

FIG. 4 illustrates a method 400 for the query optimizer to estimate the costs for an access plan to use a partially built index to satisfy a query in a computer database system. The method 400 begins by getting a partial estimate of the query using the partially built index (up to the RRN) (step 410). Next, calculate an inverse estimate (the total number of rows in the table divided by the RRN) (step 420). Calculate an extrapolated estimate for the total query costs equal to the partial estimate times the inverse estimate (step 430). Then optionally provide a confidence of the extrapolated estimate (step 440). The method is then done.

Figure 5:
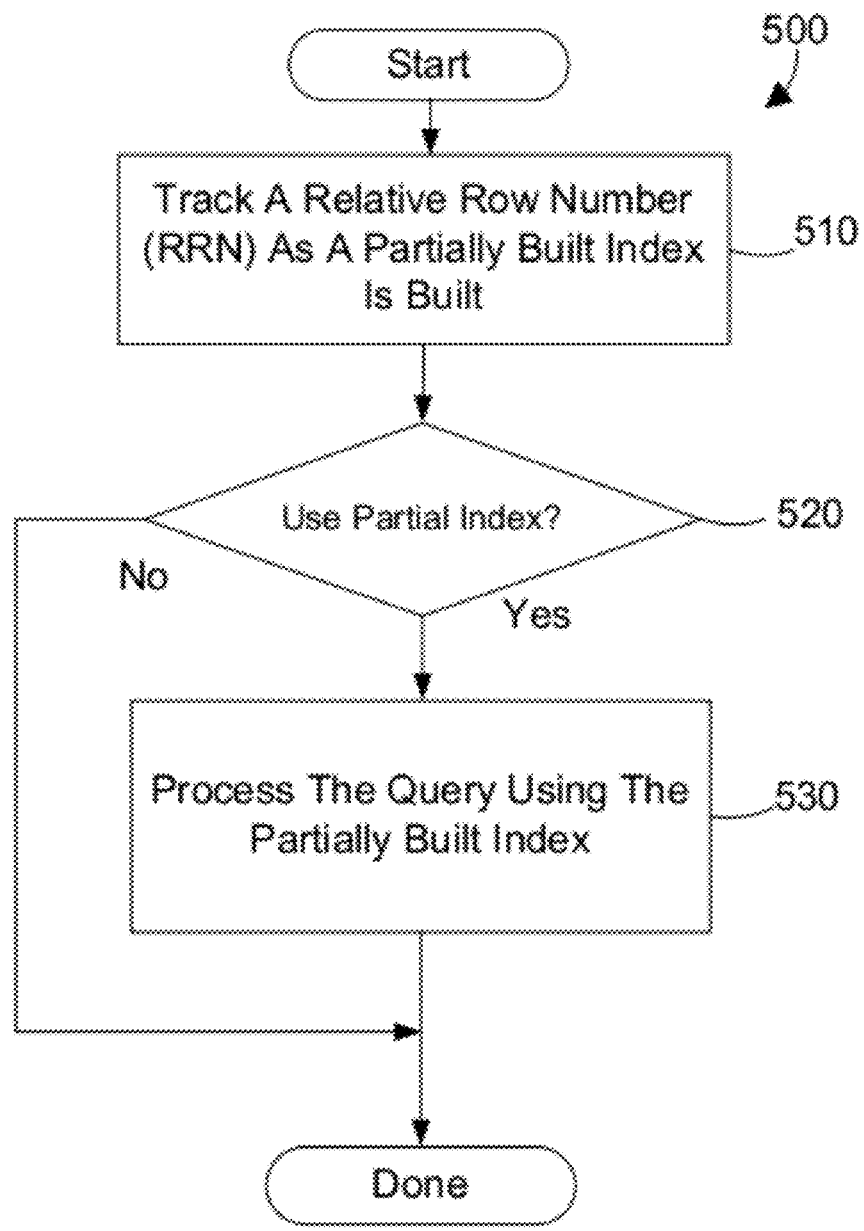
FIG. 5 is a method flow diagram for using a partially built index.
Figure 6:
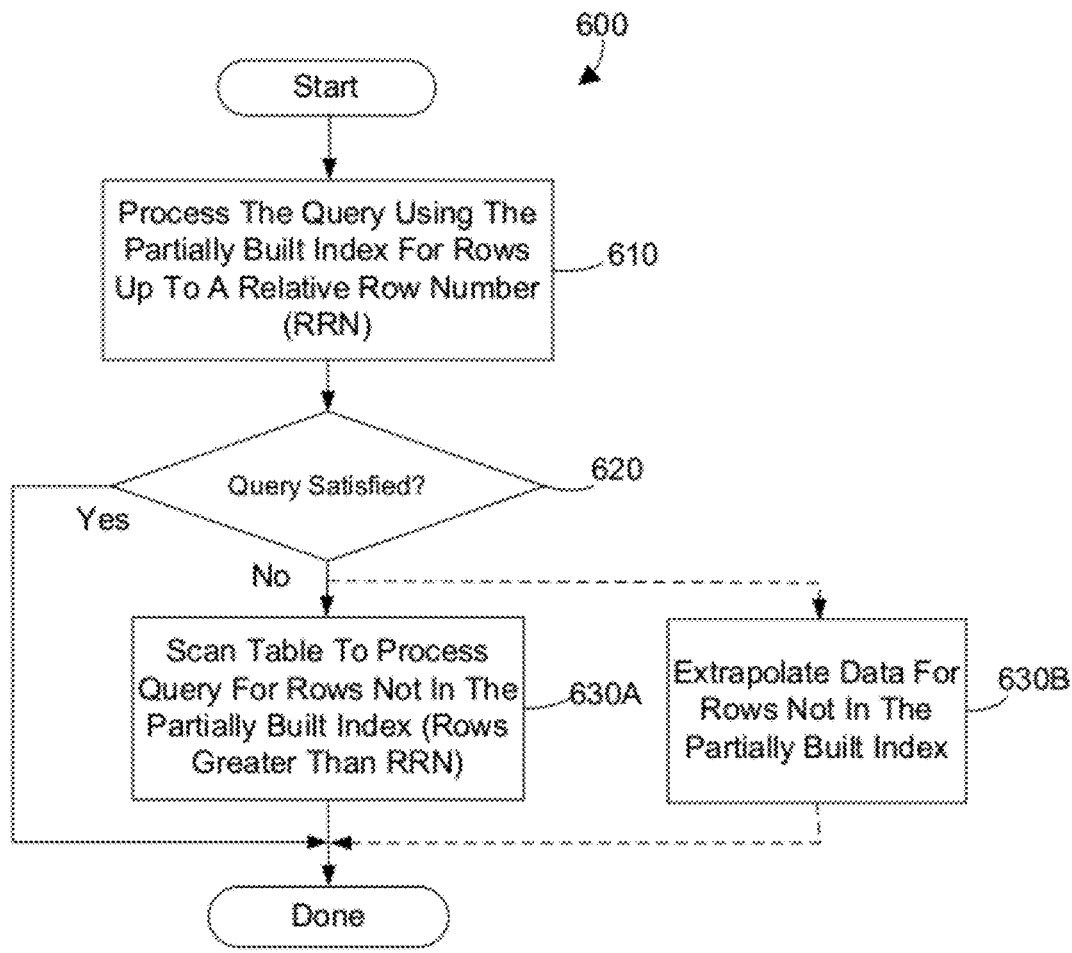
FIG. 6 is a method flow diagram for using a partially built index.
Figure 7:
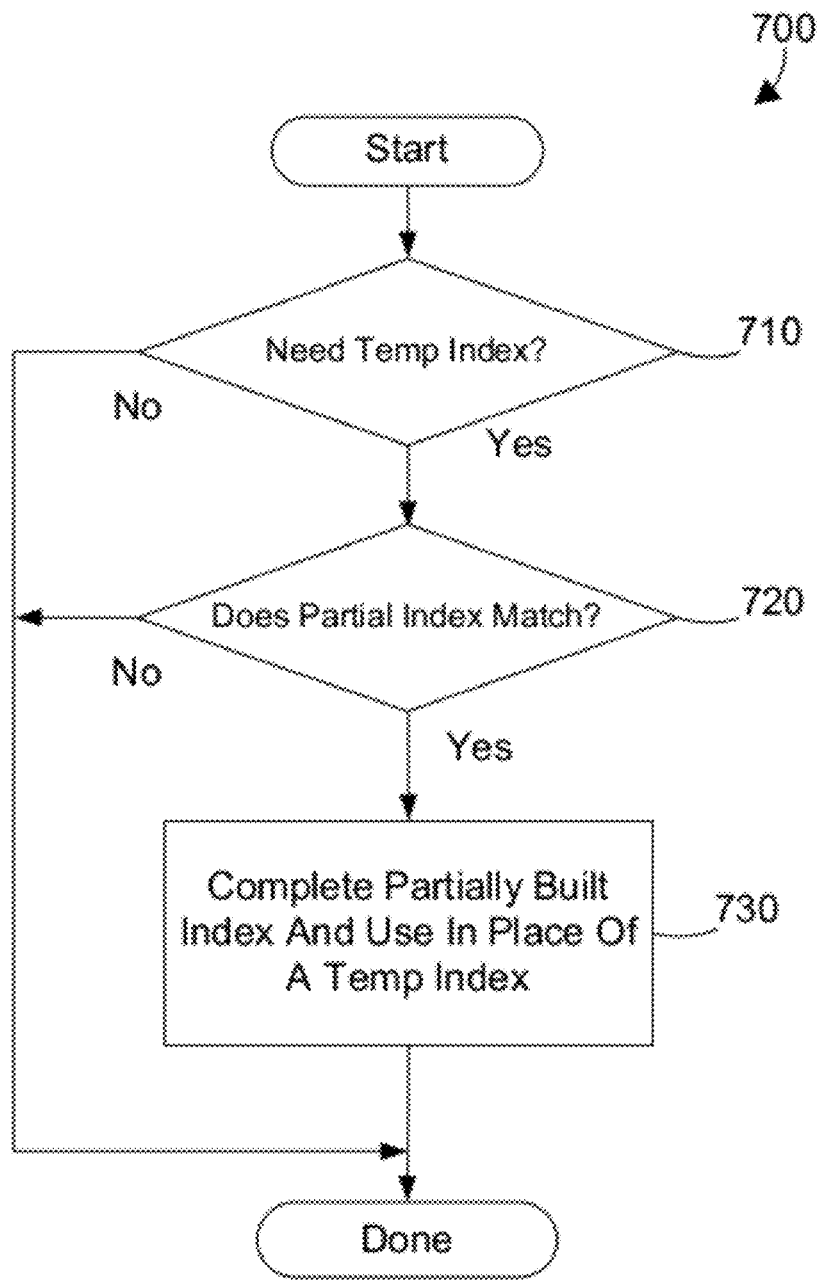
FIG. 7 is a method flow diagram for using a partially built index.

FIGS. 5 through 7 illustrate methods for using a partially built index in a computer database system to satisfy a query according to preferred embodiments described herein. These methods operate on a computer system 100 described above with reference to FIG. 1. The steps in methods are preferably performed by the database manager and the query optimizer described above. However, the steps may also be at least partially performed by other entities associated with the database system.

FIG. 5 illustrates a method 500 for using a partially built index to satisfy a query in a computer database system. The method 500 begins by tracking a dynamic relative row number (RRN) while building or rebuilding an index that indicates the current build position for the partially built index (step 510). Then the query optimizer determines whether a partial index can be used to satisfy a query (step 520). If the query can not use a partial index (step 520=no) then the method is done. If the query can use a partial index (step 520=yes) then process the query using the partially built index and the dynamically changing RRN (step 530). The method is then done.

FIG. 6 illustrates a method 600 for using a partially built index to satisfy a query in a computer database system. Method 600 is one possible implementation of step 530 in FIG. 5. The method 600 begins by processing the query using the partially built index for the rows of the database table up to the RRN (step 610). Next, determine if the query is satisfied using the partially built index (step 620). If the query is satisfied using the partially built index (step 620=yes), then the method is done (For example, this could happen if the dynamic RRN indicates the table has been completely rebuilt since the query was optimized to use the then partially built index). If the query is not satisfied using the partially built index (step 620=no), then the method proceeds to step 630A or alternatively to step 630B. In step 630A, the database manager scans the table associated with the partially built index for rows of the table that are not in partially built index as described in the first example above. Alternatively, the database manager exatrapolates the data in the table below the RRN as described in the second example above (step 630B). The method is then done.

FIG. 7 illustrates another method 700 for using a partially built index to satisfy a query in a computer database system.

Method 700 is another possible implementation of step 530 in FIG. 5. The method 700 begins by parsing the query to determine whether a temporary index is used to satisfy a query (step 710). If the query does not need a temporary index (step 710=no) then the method is done. If the query needs a temporary index (step 710=yes) then determine if the needed temporary index matches a partially built index (step 720). If the needed temporary index does not match a partial index (step 720=no) then the method is done. If the needed temporary index does match a partial index (step 720=yes) then complete the partially built index to use in place of the temporary index (step 730). The method is then done.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments provide a method and apparatus for using a partially built index in a computer database system. When a database is being built, or rebuilt, the database manager keeps track of the records processed using a relative row number (RRN) to track what part of the index is complete. Using a partially built index as described herein increases the efficiency of the database system by allowing access to the database without having to wait for the complete rebuild of the database indexes. One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

The invention claimed is:

1. A computer apparatus comprising:
   at least one processor;
   a memory coupled to the at least one processor;
   a query that accesses data in a database table in a database using an index;
   a database manager with a query optimizer residing in the memory that together perform the following:
      manage access to the database associated with the computer;
      track a relative row number (RRN) that indicates a current position in the database table as the index is being built such that the index is a partially built index for the database table up to the RRN;
      optimize a query to use the partially built index to get partial results to at least partially satisfy the query;
      satisfy the query by scanning the database table for rows of the database table greater than the RRN as the RRN changes dynamically; and
      determine whether to use the partially built index depending on a percentage complete calculated for the partially built index.

2. The computer apparatus of claim 1 wherein the query is satisfied by extrapolating the partial results of the query from the partially built index to determine an extrapolated estimate that includes results for rows of the index after the RRN.

3. The computer apparatus of claim 1 wherein the query optimizer calculates an extrapolated cost estimate to use the partially built index by calculating an inverse estimate as a number of rows in the table divided by the RRN, and multiplies the inverse estimate times a partial estimate of the query from the partially built index.

4. The computer apparatus of claim 3 wherein the query optimizer provides a confidence value for the extrapolated cost estimate.

5. The computer apparatus of claim 1 wherein the query optimizer determines a temporary index is needed and determines to finish building the partially built index rather than create the temporary index.

6. A computer implemented method for using a partially built index to satisfy a query to a database table in a computer database system comprising the steps of:
   tracking a relative row number (RRN) that indicates a current position in the database table in the computer database system as an index is being built such that the index is a partially built index for the database table up to the RRN;
   determining to use the partially built index to satisfy the query;
   optimizing a query to use the partially built index to get partial results to partially satisfy the query;
   extrapolating the partial results of the query from the partially built index to determine an extrapolated estimate that includes results for rows of the index after the RRN by performing the steps of:
   calculating an inverse ratio as a number of rows in a table divided by the RRN; and multiplying the inverse ratio times the partial results to satisfy the query entirely.

7. The computer implemented method of claim 6 wherein the step of optimizing the query to use the partially built index comprises:
   processing the query to the database table using the partially built index for rows up to the relative row number (RRN) to determine a partial result for the query; and
   processing the query for rows not in the partially built index by processing rows greater than the RRN in the database table.

8. The computer implemented method of claim 7 wherein the step of processing rows greater than the RRN comprises scanning the database table for rows not in the partially built index.

9. The computer implemented method of claim 6 further comprising the steps of calculating an extrapolated cost estimate to use the partially built index by calculating an inverse estimate as a number of rows in the table divided by the RRN, and multiplies the inverse estimate times a partial estimate of the query from the partially built index; and providing a confidence value for the extrapolated cost estimate.

10. The computer implemented method of claim 6 wherein the step of optimizing a query to use the partially built index to get partial results that partially satisfy the query comprises:
    determining a temporary index is needed and determines to finish building the partially built index rather than create the temporary index.

11. A computer-readable program product comprising:
    a database manager with a query optimizer that manages access to a database associated with a computer;
    a query that accesses data in a database table in the database using an index;
    wherein the database manager tracks a relative row number (RRN) that indicates a current position in the database table as the index is being built such that the index is a partially built index for the database table up to the RRN;
    wherein the query optimizer optimizes a query to use the partially built index to get partial results to at least partially satisfy the query;
    wherein the query is further satisfied by scanning the database table for rows of the database table greater than the RRN;
    wherein the query optimizer determines whether to use the partially built index depending on a percentage complete calculated for the partially built index; and
    non-transitory recordable media bearing the database manager.

12. The program product of claim 11 wherein the query is satisfied by extrapolating the partial results of the query from the partially built index to determine an extrapolated estimate that includes results for rows of the index after the RRN.

13. The program product of claim 11 wherein the query optimizer calculates an extrapolated cost estimate to use the partially built index by calculating an inverse estimate as a number of rows in the table divided by the RRN, and multiplies the inverse estimate times a partial estimate of the query from the partially built index.

14. The program product of claim 11 wherein the query optimizer determines a temporary index is needed and determines to finish building the partially built index rather than create the temporary index.

* * * * *